United States Patent Office 3,549,598
Patented Dec. 22, 1970

3,549,598
POST TREATMENT OF POLYUREAURETHANES
Henry A. Pace, Akron, Ohio, assignor to The Goodyear Tire & Rubber Company, Akron, Ohio, a corporation of Ohio
No Drawing. Continuation of application Ser. No. 400,573, Sept. 30, 1964. This application May 29, 1969, Ser. No. 833,857
Int. Cl. C08g 22/00
U.S. Cl. 260—75                                          5 Claims

ABSTRACT OF THE DISCLOSURE

This invention relates to a method of improving the physical properties of polyureaurethane articles which have been formed from a solution of the polyureaurethane in a solvent by treating the polyureaurethane article with an organic diisocyanate for a sufficient time to render the article essentially insoluble in dimethyl formamide on standing at 75° F. immersed for 24 hours in the dimethylformamide.

---

This application is a continuation of application Ser. No. 400,573, filed Sept. 30, 1964, now abandoned.

This invention relates to a method of increasing the physical properties of polyureaurethanes, particularly their solvent resistance and the tensile strength in sheet, film and filament forms. More particularly, it relates to a method of improving their physical properties such as increasing the tensile and the solvent resistance of polyureaurethane in sheet and film form.

Polyureaurethanes are achieving considerable commercial acceptance as manufactured articles in the form of thin films, sheets and fabric coatings. These sheets, films and fabric coatings are formed by applying the polyureaurethanes from solvent solutions or as liquid polyurethane reaction mixtures containing solvents, or by other means such as extrusion and calendering. Also, the finished product is frequently subjected to solvent or vapor conditions which may adversely affect the polyureaurethane.

It is an object of this invention to provide a method for reducing or eliminating the tendency of the polyureaurethane to swell or dissolve in solvents to which the polyureaurethane product may be exposed, as well as to improve its other physical properties.

In accordance with this invention a polyureaurethane product may be prepared in the conventional manner and then subjected to a post treatment in the presence of a solvent solution of an organic polyisocyanate to further enhance the degree of crosslinking by reacting with any of the various available reactive sites present in the polyureaurethane.

Polyureaurethane film may be prepared by pouring a solvent solution of a cured polyureaurethane upon a flat surface, doctor blading to the desired thickness, and then allowing the solvent to evaporate, leaving a cured film which will still be soluble in the original solvent. This film is either dipped in or spray coated with a solvent solution of an organic polyisocyanate such as toluene diisocyanate, for 1 to 96 hours at 100 to 250° F., depending upon the ultimate result or property desired. The excess solution is removed by a solvent wash and the film is dried either at room temperature or in an oven.

The nature of this invention may be more fully understood from the following examples wherein the parts are by weight unless indicated otherwise:

EXAMPLE I

Preparation of polyureaurethanes and their solutions

Into a suitable container was placed 900 grams of a polyester prepared from the condensation of approximately 1.1 mols of a mixed glycol of ethylene glycol, diethylene glycol, and butanediol-1,4 in equal molar quantities with approximately 1.0 mol of adipic acid. This polyester had an hydroxyl number of approximately 60 and an acid number of approximately 1 (resulting in a "reactive number" of 61) and a molecular weight of approximately 1800. To this polyester was added 92.7 grams of a mixture of 98 parts by weight of 2,4-tolylene diisocyanate and 2 parts by weight of 2,6-tolylene diisocyanate. This mixture was stirred for 36 minutes while being maintained at a temperature ranging from 60° C. to 63° C. and allowed to react to form a prepolymer. To this prepolymer was added 222 grams of a mixture of 98 parts by weight of 2,4-tolylene diisocyanate and 2 parts by weight of 2,6-tolylene diisocyanate, and 13.5 grams of castor oil. The mixture was then transferred to a 2-quart Baker-Perkins Sigma-blade mixer and 6.3 grams of catalyst (the condensation product of 1 mol of aniline and 4 mols of n-butyraldehyde) was added. After mixing for 4 minutes, 27.3 grams of water was added at which time the mixture began to foam, this foam was destroyed by the shearing action of the Sigma-blades. Some 3 minutes after the addition of the water, 5 cubic centimeters of N-methyl morpholine (another catalyst) was added. After this mixture had been allowed to mix for a period of approximately 20 minutes in the Baker-Perkins mixer, the formation of elastomer was observed. The mixing was continued for an additional 30-minute period, during which time the elastomer was reduced to a pulverulent form. This was done to allow ease of handling and removal of the elastomer from the mixer. This powdered elastomer was heated in a 100° C. oven for 60 minutes to complete the cure. Then a 33% by weight solution was prepared by dissolving the cured elastomer in dimethylformamide containing 1% di-n-butylamine as a dissolution agent.

EXAMPLE II

The procedure described in Example I was duplicated except that no castor oil was added to the polyester.

EXAMPLE III

The procedure described in Example I was repeated except that the polyester was a condensation product of approximately 1.1 mols of an 80/20 molar ratio of ethylene glycol/propylene glycol with approximately 1.0 mol of adipic acid. This polyester had an hydroxyl number of approximately 58 and an acid number of less than 1 and a molecular weight of approximately 1900. A 33% solution of the cured elastomer in dimethylformamide was prepared.

While the following three examples are not illustrative of the preferred practice of this invention, they are included to illustrate that the resulting elastomers are only partially soluble in dimethylformamide if the 2,6-isomer content of the mixed tolylene diisocyanate used in the preparation of these elastomers is more than 10% by weight of the total mixture of diisocyanates and completely insoluble if more than 20% of the 2,6-isomer is employed.

EXAMPLE IV

The same procedure was used as in Example I except that the tolylene diisocyanate was a mixture of 80% of the 2,4-isomer and 20% of the 2,6-isomer, by weight.

EXAMPLE V

The same procedure was used as in Example IV except that, instead of 13.5 grams, only 6.8 grams of castor oil were added to the polyester.

EXAMPLE VI

The same procedure was used as in Example I except that the tolylene diisocyanate used was a mixture of 48% of the 2,4-isomer and 52% of the 2,6-isomer, by weight.

Table 1 below summarizes the properties of the elastomers resulting from Examples IV through VI.

TABLE 1

| Example | 2,4-2,6-TDI ratio | Reaction time, mins. | Solubility in DMF [1] | Cast film Ultimate tensile, p.s.i. | Cast film Ultimate elongation, percent |
|---|---|---|---|---|---|
| 5 | 80/20 | 24 | Fair [2] | 1,649 | 845 |
| 6 | 80/20 | 21 | Fair [2] | 2,030 | 833 |
| 7 | 48/52 | 20 | Insoluble | Could not be tested | |

[1] Dimethylformamide containing 1% di-n-butylamine.
[2] Solutions contained undissolved gel which was filtered out before casting the film.

The following two experiments, while they do not illustrate the preferred method of forming soluble polyureaurethanes, illustrates that polymer or elastomer may be formed using only one of the aforementioned catalysts.

EXAMPLE VII

The procedure according to Example I was performed except that the N-methyl morpholine was eliminated from the reaction mixture. This resulted in a product having low tensile strength, i.e., 1537 p.s.i.

EXAMPLE VIII

The procedure according to Example I was repeated except that the condensation product of 1 mol of aniline with 4 mols of n-butyraldehyde was eliminated. This resulted in a product which was rather difficult to dissolve.

EXAMPLE IX

To a 50-gallon Baker-Perkins mixer, equipped with two counter-rotating sigma blades and a cooling water jacket, was added 60 pounds of a linear polyester prepared from the condensation of approximately 1.1 mols of a mixed glycol of ethylene glycol, diethylene glycol and butanediol-1,4 in equal molar quantities with approximately 1.0 mol of adipic acid (having a hydroxyl number of approximately 60 and an acid number of approximately 2, resulting in a "reactive number" of approximately 62). The mixer was started and 0.94 pound of castor oil and 21 pounds of 100% 2,4-tolylene diisocyanate were added (if pigments such as extenders or coloring agents are to be employed they may be added at this time). About 3 minutes were allowed to effect a uniform solution after which 0.437 pound of catalyst comprising a condensation product of 1 mol of aniline and 4 mols of n-butyraldehyde was added and the mixture allowed to continue stirring for approximately 3 minutes. Then to this mixture was added 1.89 pounds of water at which time some foaming was detected. After approximately 3 or 4 minutes, 0.318 pound of the other catalyst, N-methyl morpholine, was added. During the first minute after the addition of the second catalyst vigorous foaming was observed which then subsided and the reaction mixture became more and more viscous. After several minutes it was observed that the mixture had been transformed from a viscous liquid to a soft solid mass. Seventeen minutes after the addition of the N-methyl morpholine the mass began to crumble, as it was now converted to a solid elastomer. The solid elastomer was allowed to remain in the mixer 14 minutes to complete its conversion to crumb form. This material was cured at 125° C. in a hot air oven for varying lengths of time, each sample of which was formed into a 33⅓ solution in dimethyl formamide containing about 1.0% of di-n-butylamine, and solution viscosities determined.

The following example illustrates a somewhat larger scale practice of this invention.

EXAMPLE X

The 33% by weight solution of polyureaurethane from Example IX was cast on a glass plate and drawn down under a doctor blade to give a sheet 12 mils thick upon the evaporation of the solvent.

Test samples were cut from the sheet and then soaked in a solvent solution of the organic isocyanate for 64 hours at about 75° F. The samples were then removed from the solvent solution of organic isocyanate and placed to soak at about 75° F. for 24 hours in the solvent. This soak treatment removed any unreacted organic isocyanate. The samples after the soak treatment were allowed to dry at 80° C. for 48 hours. The physical test results on the dry samples are shown in Table 2 for various solvent solutions of organic isocyanates at various concentrations:

TABLE 2.—EFFECT OF ISOCYANATE CONCENTRATIONS ON POLYUREAURETHANE PROPERTIES

| Sample No. | Solution Solvent | Organic isocyanate PI | Organic isocyanate TDI | Organic isocyanate MDI | Moles-NCO per gram, 1×10⁻⁴ | Moduli 100% | Moduli 300% | Moduli 500% | Tensile, p.s.i. | Elongation, percent | Q value in DMF |
|---|---|---|---|---|---|---|---|---|---|---|---|
| 1 | 0 | 0 | 0 | 0 | 0 | 612 | 896 | 1,348 | 5,020 | 900 | (³) |
| 2 | THF [1] | 0 | 0 | 0 | 0 | 604 | 924 | 1,324 | 5,622 | 945 | (³) |
| 3 | T [2] | 0 | 0 | 0 | 0 | 673 | 997 | 1,503 | 5,639 | 880 | (³) |
| 4 | THF | .01 | | | 1.14 | 586 | 921 | 1,358 | 5,620 | 915 | (³) |
| 5 | THF | .05 | | | 1.59 | 587 | 910 | 1,346 | 4,820 | 895 | (³) |
| 6 | THF | .15 | | | 1.76 | 576 | 925 | 1,369 | 5,551 | 900 | (³) |
| 7 | 0 | 0 | | | 8.5 | 574 | 902 | 1,353 | 5,481 | 920 | (³) |
| 8 | THF | | .01 | | 2.88 | 798 | 1,424 | 4,051 | 9,892 | 613 | 13.1 |
| 9 | THF | | .05 | | 2.85 | 804 | 1,474 | 4,348 | 12,152 | 630 | 9.0 |
| 10 | THF | | .15 | | 2.93 | 838 | 1,582 | 6,318 | 12,085 | 588 | 5.3 |
| 11 | 0 | | 0 | | 11.7 | 904 | 2,044 | 11,011 | 11,643 | 507 | 5.0 |
| 12 | THF | | | .01 | 2.92 | 616 | 1,083 | 2,610 | 10,584 | 690 | 16.4 |
| 13 | THF | | | .05 | 2.83 | 729 | 1,375 | 4,292 | 11,938 | 623 | 7.8 |
| 14 | THF | | | .15 | 2.86 | 783 | 1,565 | 6,087 | 12,122 | 592 | 4.9 |
| 15 | THF | | | .30 | 3.13 | 816 | 1,695 | 8,085 | 12,932 | 575 | 3.8 |
| 16 | T | .01 | | | 1.08 | 635 | 962 | 1,558 | 5,781 | 857 | (³) |
| 17 | T | .05 | | | | 654 | 1,005 | 1,575 | 5,992 | 855 | (³) |
| 18 | T | .15 | | | 3.1 | 635 | 957 | 1,544 | 5,913 | 880 | (³) |
| 19 | T | | .01 | | 4.2 | 1,001 | 2,001 | 8,999 | 10,930 | 525 | 6.3 |
| 20 | T | | .05 | | 5.0 | 979 | 1,851 | 7,701 | 11,576 | 570 | 7.9 |
| 21 | T | | .15 | | 4.3 | 1,020 | 1,979 | 9,018 | 12,247 | 553 | 5.9 |
| 22 | T | | | .01 | 3.3 | 784 | 1,412 | 4,527 | 11,136 | 610 | 8.7 |
| 23 | T | | | .05 | 5.0 | 927 | 1,857 | 8,643 | 10,500 | 530 | 5.3 |
| 24 | T | | | .15 | 9.5 | 923 | 1,789 | 8,480 | 10,485 | 530 | 4.8 |

[1] T indicates toluene is the solvent.
[2] THF indicates tetrahydrofuran is the solvent.
[3] Soluble.

NOTE: Q value is the number of grams of solvent imbibed by one gram of polyureaurethane.
0 = Infinity (no THF present).
In the above table, PI, TDI and MDI are the respective abbreviations for phenyl isocyanate, toluene diisocyanate and methane diphenyl isocyanate. The numbers in the columns under these symbols indicate the mols of the organic isocyanate present in a liter of the solvent.

Similar results were obtained when films were cast from the solutions of Examples II to VIII, and the resulting film given a post treatment by soaking in a solvent solution of the organic isocyanates.

EXAMPLE XI

A diffusion cell made from a commercial dimethylformamide solution of a polyureaurethane was found to have a fluid/vapor permeability of 23 milligrams of dibromotetrafluoroethane per square centimeter per 24 hours at 75° F. This diffusion cell was immersed for 24 hours in a toluene solution of toluene diisocyanate at 75° F. The fluid/vapor permeability of this treated cell was lowered to 9 milligrams of dibromotetrafluoroethane per square centimeter per 24 hours.

The polyureaurethane solutions useful for making articles such as films, impregnated textile goods, etc., are prepared by dissolving a polyureaurethane in a solvent such as the liquid dialkyl amides where the alkyl radical has from 1 to 10 carbon atoms and higher and the dialkyl sulfoxides such as dimethylsulfoxide. Usually the solution will contain from about 5 to 40% or a higher percentage by weight of the polyureaurethane. Also, the presence of about 0.5 to 5% of an amine, aids the preparation of the polyureaurethane solutions when a dialkyl amide such as dimethylformamide is used. Amines are not required with dimethylsulfoxide.

Generally, the polyureaurethanes are the reaction product of a reactive hydrogen containing polymeric material of about 500 to 6000 molecular weight and preferably about 750 to 3000, and an organic polyisocyanate with water. The polyester polyols such as the condensation product of adipic acid or anhydride with ethylene glycol or a small amount of a trifunctional material, for instance glycerol, are well suited for use in this invention as well as the polyether polyols such as polypropylene ether glycol or triol.

The reactive hydrogen containing polymeric materials usually are mixed with about 1 to 2.5 or more mols of organic polyisocyanate for each mol thereof. U.S. Pats. 2,755,266 and 3,142,652 further illustrates how to prepare the polyureaurethanes and list some of the useful solvents such as dimethylacetamide and dimethyl propionamide in which the polyureaurethane dissolve to form the solutions used to form the articles such as films to which this invention is related. Other useful solvents are the dialkylsulfoxides where the alkyl has from one to about 10 or more carbon atoms.

Any of the many organic diisocyanates may be used to post-treat the polyureaurethanes formed from solutions to improve the physical properties of the polyureaurethane.

Representative members of the di, tri and higher isocyanates are toluene diisocyanate, tolidine diisocyanate, hexamethylene diisocyanate and the phosgenated products of the aldehydeamine resins such as formaldehyde aniline.

Normally, solvent solutions of the organic isocyanates are preferred as this permits the organic diisocyanate to penetrate and wet the polyureaurethane more readily. The strength of the solutions will very from saturated at the application temperature—normally about 75 to 250° F.—to very dilute, about 0.01 molar. The very dilute solutions are preferred, i.e., 0.01 to 0.2 molar.

Any of the relatively inert solvents for the organic diisocyanates may be used with the preferred ones being those exhibiting some tendency to penetrate the polyureaurethane.

Representative solvents are those boiling below about 300° F. such as aromatic and aliphatic liquid hydrocarbons, halogenated hydrocarbons, nitro hydrocarbons, cyclic ethers, etc.

The soluble polyureaurethanes from Example IX used in these experiments had a tensile strength of 2,000 p.s.i. at a 960% elongation while that used in the experiments listed in Table 3 had a tensile of 5,000 p.s.i. at a 900% elongation. Still, upon treatment of each of these samples with TDI in toluene the tensiles increased into the 12,000–14,000 p.s.i. range. This would indicate that the basic polymeric structure obtained in production is quite similar between batches but, that the degree to which the original crosslinking can be controlled, varies to give varying tensiles in the basic product. Thus, post crosslinking gives ultimate uniform physical properties in these polyureaurethanes, regardless of initial batch to batch variations.

A most intriguing fact is that, after only one hour immersion in the toluene-TDI solution (.0625M on TDI or, .125M on -NCO), the tensile increased six-fold, while the elongation decreased, as expected from 965% to 608%.

It made no difference whether the immersed samples were subsequently dried at room temperature or at 80° C.

As far as tensile strength is concerned, immersions of over one hour adds nothing further to the tensile. However, as the immersion time is increased, the continuing crosslinking process drops the elongation to 500%, with a slight drop in the tensile to about 10,000 p.s.i., at the end of five hours.

While on the subject of tensile, it was found that the tensile rose to 11,000 p.s.i. (Samples 12, 13 and 14) in one hour at 100° C. and stayed at this level during the four hour heating time. The other significant effect of the TDI was on the solubility and Q value in DMF, as may be seen from Table 3:

TABLE 3.—POST CROSSLINKING EFFECT OF TDI ON POLYUREAURETHANE

| Sample No. | Immersion time, hours | Moles-NCO per gram, 1×10⁻⁴ | Moduli 100% | Moduli 300% | Moduli 500% | Tensile, p.s.i. | Elongation, percent | DMF soluble fraction, percent | Q value in DMF |
|---|---|---|---|---|---|---|---|---|---|
| 1 | 0 | 0 | 650 | 875 | 1,109 | 2,127 | 965 | 100 | (¹) |
| 2 | 1 | 3.26 | 1,144 | 1,933 | 6,178 | 13,516 | 608 | 60 | >20 |
| 3 | 2 | 4.82 | 1,160 | 2,115 | 7,888 | 12,075 | 560 | 55 | >20 |
| 4 | 3 | 4.67 | 1,157 | 2,250 | 8,500 | 12,532 | 560 | 63 | >20 |
| 5 | 5 | 7.1 | 1,260 | 2,420 | 9,860 | 9,940 | 503 | 38 | 20 |
| 6 | 8 | 8.5 | 1,312 | 2,793 | | 10,470 | 490 | 22 | 9.5 |
| 7 | 24 | 12.7 | 1,488 | 3,490 | | 11,180 | 462 | 9 | 5.3 |
| 8 | 96 | 23.4 | 2,703 | | | 7,964 | 268 | 5.4 | 3.5 |
| 9 | 1 hr./70° C | 4 | 1,078 | 1,843 | 6,173 | 11,633 | 594 | 61 | >20 |
| 10 | 1 hr./80° C | 5 | 1,080 | 1,980 | 7,480 | 11,260 | 573 | 58 | >20 |
| 11 | 1 hr./90° C | 5.9 | 1,115 | 2,154 | 8,269 | 11,154 | 555 | 36 | 19 |
| 12 | 1 hr./100° C | 5.6 | 1,182 | 2,364 | 9,136 | 10,955 | 530 | 24 | 11 |
| 13 | 2 hrs./100° C | 6.0 | 1,187 | 2,521 | | 9,375 | 490 | 14 | 6.9 |
| 14 | 4 hrs./100° C | 7.4 | 1,320 | 3,003 | | 10,168 | 473 | 8 | 4.9 |
| 2X | 1 | 3.66* | 711 | 968 | 1,241 | 2,459 | 988 | 100 | (¹) |
| 4X | 3 | 4.56* | 724 | 976 | 1,243 | 2,448 | 1,010 | 100 | (¹) |
| 6X | 8 | 5.58* | 730 | 1,053 | 1,359 | 2,906 | 973 | 100 | (¹) |
| 7X | 24 | 6.93* | 761 | 1,108 | 1,455 | 3,786 | 1,005 | 100 | (¹) |

¹ Soluble.
*These values indicate percent by weight of material extracted, at 70° C. when immersed for time indicated, from the corresponding samples 2 to 7 above before post treatment with isocyanate.

From a comparison of the effects of the post monoisocyanate treatment of the film with that of the post diisocyanate treatment in Table 2, it appears that the diisocyanate in the post treatment functions as a crosslinking agent since the monoisocyanate post treatment did not appreciably effect the solubility, tensile or elongation of the polyureurethane, even though the data indicates a comparatively large amount of the isocyanate reacted with the active sites in the polyureaurethane.

From the foregoing examples and description, it should be evident that this invention provides a method of converting processible, solvent cementable coatings, films and sheet stocks into a higher tensile, less soluble material. Thus, a soluble polyureaurethane can be formed into films and sheets, for example, and then be cemented into an integral structure with dimethylformamide which by this post polyisocyanate treatment can be rendered essentially insoluble in ordinary hydrocarbon solvents and also have its tensile properties improved.

While certain representative embodiments and details have been shown for the purpose of illustrating the invention, it will be apparent to those skilled in this art that various changes and modifications may be made therein without departing from the spirit or scope of the invention.

What is claimed is:

1. A method for producing an improved polyureaurethane article which comprises forming said article by applying a solution of a cured polyureaurethane comprising a solvent solution of a reaction product of a polyester or polyether with an organic polyisocyanate to a surface to yield an article upon the evaporation of the solvent, the polyureaurethane of the article being characterized as soluble in dimethylformamide and then contacting the polyureaurethane of the article with an organic polyisocyanate for sufficient time to render the article essentially insoluble in dimethylformamide on standing immersed for 24 hours in the dimethylformamide at 75° F.

2. The method of claim 1 wherein the solution of polyureaurethane comprises the reaction product of a reactive hydrogen containing polymeric material and an organic polyisocyanate and a solvent selected from the class consisting of the dialkyl amides and dialkyl sulfoxides.

3. The method of claim 2 wherein the solvent is dimethylformamide plus an amine.

4. The method of claim 2 wherein the organic diisocyanate is toluene diisocyanate.

5. The method of claim 3 wherein the organic diisocyanate is toluene diisocyanate.

References Cited

UNITED STATES PATENTS 2,920,800  3/1960  Hill _____ 260—77.5
2,785,150  3/1957  Kreider et al. _____ 260—75

OTHER REFERENCES

Hodgman: "Handbook of Chemistry and Physics," Chemical Rubber Publishing Co., 1951, p. 1146.

Saunders et al.: "Polyurethanes," Part II, Interscience, N.Y., 1964, pp. 303–308.

DONALD E. CZAJA, Primary Examiner

M. J. WELSH, Assistant Examiner

U.S. Cl. X.R.

260—77.5